(12) United States Patent
Sumimoto et al.

(10) Patent No.: US 6,824,308 B2
(45) Date of Patent: Nov. 30, 2004

(54) TEMPERATURE DETECTING DEVICE

(75) Inventors: Yoshiyuki Sumimoto, Kasugai (JP); Tomohisa Tamura, Okazaki (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/697,714

(22) Filed: Oct. 30, 2003

(65) Prior Publication Data

US 2004/0114667 A1 Jun. 17, 2004

(30) Foreign Application Priority Data

Nov. 7, 2002 (JP) ........................................ 2002-323361

(51) Int. Cl.[7] ........................... G01K 15/00; G01K 7/30
(52) U.S. Cl. ............................... 374/185; 374/1; 702/99
(58) Field of Search ........................ 374/57, 170, 171, 374/172, 175, 183, 185, 100, 1; 702/99

(56) References Cited

U.S. PATENT DOCUMENTS

| | | | | |
|---|---|---|---|---|
| 3,728,702 A | * | 4/1973 | Miyamoto et al. | 340/595 |
| 4,505,600 A | * | 3/1985 | Suzuki et al. | 374/170 |
| 4,516,865 A | * | 5/1985 | Hideo | 374/172 |
| 4,725,150 A | * | 2/1988 | Ishida et al. | 374/170 |
| 5,043,692 A | * | 8/1991 | Sites et al. | 338/28 |
| 5,107,246 A | * | 4/1992 | Mogaki | 340/449 |
| 5,116,136 A | * | 5/1992 | Newman et al. | 374/102 |
| 5,140,302 A | * | 8/1992 | Hara et al. | 340/449 |
| 5,253,938 A | * | 10/1993 | Stixrud | 374/173 |
| 5,481,199 A | * | 1/1996 | Anderson et al. | 324/705 |
| 5,748,429 A | * | 5/1998 | Peterson | 361/106 |
| 5,876,122 A | * | 3/1999 | Eryurek | 374/183 |
| 6,048,094 A | * | 4/2000 | Tornare | 374/183 |
| 6,097,240 A | * | 8/2000 | Lapushin | 327/513 |
| 6,161,958 A | * | 12/2000 | Rattman et al. | 374/1 |
| 6,320,450 B1 | * | 11/2001 | Lee et al. | 327/513 |
| 2002/0097095 A1 | * | 7/2002 | Jeon et al. | 330/289 |
| 2004/0062288 A1 | * | 4/2004 | Falk | 374/1 |

FOREIGN PATENT DOCUMENTS

| | | | | |
|---|---|---|---|---|
| EP | 129132 A1 | * | 12/1984 | G01K/3/10 |
| EP | 0 309 664 | | 4/1989 | G01K/7/24 |
| EP | 0 828 146 | | 3/1998 | G01K/15/00 |
| JP | 62288537 A | * | 12/1987 | G01K/7/24 |
| JP | 06137963 A | * | 5/1994 | G01K/7/24 |
| JP | 7-190576 | | 7/1995 | F25B/49/02 |

OTHER PUBLICATIONS

European Search Report dated Jan. 23, 2004 (3 pgs.).
Patent Abstracts of Japan; Publication No. 07190576 dated Jul. 28, 1995 (1 pg.).
Patent Abstracts of Japan, Publication No. 07–190576 dated Jul. 28, 1995 (7 pgs.).
Patent Abstracts of Japan, Publication No. 10–206250 dated Aug. 7, 1998 (6 pgs.).

* cited by examiner

*Primary Examiner*—Gail Verbitsky
(74) *Attorney, Agent, or Firm*—Osha & May L.L.P.

(57) ABSTRACT

A temperature detecting device is provided which can reduce manufacturing cost. Provided that the pull-up resistance has a resistance value $R_P$ and the heat-sensitive resistance element has a resistance value $R_T$, the voltage (V1) of the heat-sensitive resistance element in the case of the first voltage extraction mode is given by "$VCC \times R_T/(R_P+R_T)$" while the voltage (V2) of the heat-sensitive resistance element in the case of the second voltage extraction mode is given by "$VCC \times R_T/(2R_P+R_T)$". When the two heat-sensitive resistance elements are normally operating (no occurrence of disconnection or short circuit failure), the voltages respectively extracted in the first and second extraction modes have a ratio matching a ratio of the foregoing two equations (V1:V2). Thus, the two heat-sensitive resistance elements can be positively determined for a presence or absence of failure.

5 Claims, 14 Drawing Sheets

TEMPERATURE DETECTING DEVICE

BACKGROUND OF THE INVENTION

1. Technical Field of the Invention

This invention relates to temperature detecting devices, and more particularly to a temperature detecting device for detecting a heat on a heater (power transistor or the like) of a power-operated auxiliary steering system mounted on a vehicle, say an automobile, by the use of a heat-sensitive resistance element (element having a resistance value changing sensitive to heat; thermistor, platinum ohmmeter or the like).

2. Description of the Related Art

In the power-operated auxiliary steering system, generally the manipulation amount of a steering wheel is converted into an electric signal and amplified by a power transistor. By an output of the transistor, the motor built in the steering unit is driven to generate an auxiliary steering force commensurate with the manipulation amount.

FIG. 13 is an essential-part device structural view of a power-operated auxiliary steering system. In this figure, 1 is a control unit for converting a manipulation amount of steering wheel into an electric signal, 2 is a power unit, and 3 is a motor. In many cases, the control unit 1 and the power unit 2 are accommodated within the separated cases. This is because of a countermeasure not to cause a malfunction in the constituent part (microcomputer and its peripheral circuits, etc.) of the control unit 1 under the influence of a heat of the power transistor 2a included in the power unit 2.

The power transistor 2a included in the power unit 2 has a heat in an amount increasing with a drive current to the motor 3. It also increases depending upon a temperature of service environment under the blazing sun in the daytime. For this reason, particularly, the power transistor 2a for vehicular application essentially necessitates a preventive measure against thermal degradation. It is a conventional practice to arrange heat-sensitive resistance elements 2b, 2c (reason for providing two elements will be referred later) such as thermistors in locations beside the power transistor 2a. The temperature-detection signal of the same is captured into the control unit 1, to carry out a temperature compensation for reducing the driving current to the motor 3 when the temperature is high.

In the meanwhile, the "heat-sensitive resistance element" such as a thermistor suffers a failure of "disconnection" or "short circuit" to rarely occur. In the case of a disconnection failure of those, because device output is lost at once, the failure is easy to sense, e.g. measure can be readily taken including to issue an alarm to the driver. However, in the case of a short circuit failure, because symptom gradually proceeds from a partial short circuit into a whole short circuit, device output changes little by little thus making it difficult to sense a short circuit failure. For this reason, in the case of detecting a temperature lower than the actual temperature, the power transistor 2a is driven by an excessive driving current. This results in a disadvantage that the power transistor 2a is deteriorated acceleratedly.

Thus, there is known an art that a plurality of (usually, two) heat-sensitive resistance elements 2b, 2c are provided to compare between the detection signals thereof, making it possible to sense an occurrence of failure (disconnection or short circuit) in any one of the heat-sensitive resistance elements 2b, 2c. For example, Patent Document 1 has two thermistors having the same characteristics (e.g. negative characteristics that resistance value lowers with increasing temperature), so that the end-to-end voltage Va, Vb of the thermistors can be converted into detection temperatures Ta, Tb for extraction. Furthermore, the lower detection temperature of those is employed as a correct detection temperature.

Herein, the reason of "employing the lower detection temperature as a correct detection signal" is because of the following reason. Namely, as described in a passage [0061] of the document, "in the case that a short circuit failure occurs in any one of the two thermistors, errors are caused in the detection temperature Ta, Tb obtained from the thermistor end-to-end voltage Va, Vb. Because of the negative characteristic of thermistor, the error in the detection temperature Ta, Tb is toward the higher temperature. Accordingly, by employing the "lower" detection temperature, the thermistor on which a short circuit failure occurs can be ignored. Eventually, temperature detection is possible without encountering errors."

[Patent Document 1]

JP-A-7-190576 (pages 2–7, FIG. 8)

However, the temperature detecting device in the prior art is nothing more than an arrangement with two heat-sensitive resistance elements in locations nearby the heater, or a power transistor, wherein detection signals thereof is captured into the control unit for the purpose of comparison and consideration, thus involving the following problem.

FIG. 14 is an essential-part connection diagram of a control unit 1 and a power unit 2. The power unit 2 has a power transistor 2a as a heater and two heat-sensitive resistance elements 2b, 2c (hereinafter referred to as "a first heat-sensitive resistance element 2b, a second heat-sensitive resistance element 2c") arranged in locations nearby the power transistor 2a. The control unit 1 has two pull-up resistances 1a, 1b (hereinafter referred to as "a first pull-up transistor 1a, a second pull-up transistor 1b") and a microcomputer 1e incorporating (or satisfactorily attached externally with) two AD converters 1c, 1d (hereinafter referred to as "a first AD converter 1c, a second AD converter 1d"). Note that "AD converter" is an abbreviated form of analog-to-digital converter.

Four lines 3a–3d are laid between the control unit 1 and the power unit 2. The first heat-sensitive resistance element 2b has one end connected to an input terminal of the first AD converter 1c through the line 3a and to a power source VCC through the first pull-up resistance 1a. The other end of the first heat-sensitive resistance element 2b is connected to a ground 1f of the control unit 1 through the line 3b. Meanwhile, the second heat-sensitive resistance element 2c has one end connected to an input terminal of the second AD converter 1d through the line 3c and to the power source VCC through the second pull-up resistance 1b. The other end of the second heat-sensitive resistance element 2c is connected to the ground if of the control unit 1 through the line 3d.

The disadvantages in this configuration lies in the four lines 3a–3d needed between the control unit 1 and the power unit 2, the two pull-up resistances 1a, 1b needed in the control unit 1, and the two AD converters 1c, 1d needed in the control unit 1. Eventually, the disadvantages are to pose a problem of increasing the number of parts and raising the cost of manufacturing.

Therefore, it is an object of the present invention to provide a temperature detecting device capable of reducing the number of lines between the control unit and the power unit, the number of pull-up resistances within the control unit or the number of AD converters within the control unit, thereby reducing the manufacturing cost.

SUMMARY OF THE INVENTION

A temperature detecting device according to this invention comprises: two heat-sensitive resistance elements arranged nearby an arbitrary heater and made even in characteristic; extraction-mode executing means for selectively executing a first voltage extraction mode for connecting the two heat-sensitive resistance elements in parallel between a power source and a ground through one of a pull-up resistance and a pull-down resistance and extracting a voltage of the two heat-sensitive resistance elements by a resistance divisional voltage, and a second voltage extraction mode for connecting any one of the two heat-sensitive resistance elements between the power source and the ground through one of a pull-up resistance and a pull-down resistance and extracting a voltage of the one heat-sensitive resistance element by a resistance divisional voltage; and determining means for determining whether or not the voltage extracted in the first extraction mode and the voltage extracted in the second extraction mode have a ratio matching a predetermined ratio, thereby determining a presence or absence of failure in the two heat-sensitive resistance elements.

Herein, the "heat-sensitive resistance element" may be a non-linear output element such as a thermistor or a linear output element such as platinum ohmmeter. Meanwhile, although there are two kinds of element temperature characteristics, i.e. the type having a resistance value decreasing with increasing temperature (negative characteristic) and the type reverse to it (positive characteristic), any of these may be used.

According to this invention, provided that the pull-up resistance or pull-down resistance has a resistance value $R_P$ and the heat-sensitive resistance element has a resistance value $R_T$, the voltage (V1) of the heat-sensitive resistance element in the case of the first voltage extraction mode is given by "$VCC \times R_T/(R_P+R_T)$" while the voltage (V2) of the heat-sensitive resistance element in the case of the second voltage extraction mode is given by "$VCC \times R_T/(2R_P+R_T)$".

Accordingly, when the two heat-sensitive resistance elements are normally operating (no occurrence of disconnection or short circuit failure), the voltages respectively extracted in the first and second extraction modes have a ratio matching a ratio of the foregoing two equations (V1:V2), i.e. matches "$1/(R_P+R_T):1/(2R_P+R_T)$". Thus, the two heat-sensitive resistance elements can be positively determined for a presence or absence of failure.

Meanwhile, in the case of separately providing a unit accommodating a heater and two heat-sensitive resistance elements and a unit accommodating a pull-up or pull-down resistance, extraction mode executing means and determining means and thereby connecting between these with a wire line, it is satisfactory to provide at least a first line connecting between the pull-up or pull-down resistance and the two heat-sensitive resistance elements, a second line connecting between one heat-sensitive resistance element and extraction mode executing means, and a third line connecting between the other heat-sensitive resistance element and a ground or power source. Thus, the number of lines can be reduced as compared to the prior art (see FIG. 14). Meanwhile, because of selective execution of first and second extraction modes, one AD converter can be shared between the modes, making it possible to reduce the number of AD converters and the number of pull-up or pull-down resistances.

A temperature detecting device according to this invention comprises: two heat-sensitive resistance elements arranged nearby an arbitrary heater and made even in characteristic; extraction-mode executing means for selectively executing a first voltage extraction mode for connecting the two heat-sensitive resistance elements in series between a power source and a ground through one of a pull-up resistance and a pull-down resistance and extracting respective voltages of the two heat-sensitive resistance elements by a resistance divisional voltage, and a second voltage extraction mode for connecting any one of the two heat-sensitive resistance elements between the power source and the ground through one of a pull-up resistance and a pull-down resistance and extracting a voltage of the one heat-sensitive resistance element by a resistance divisional voltage; and determining means for determining whether or not the two voltages extracted in the first extraction mode have a ratio matching a predetermined ratio, thereby determining a presence or absence of failure in the two heat-sensitive resistance elements.

According to this invention, provided that the pull-up resistance or pull-down resistance has a resistance value $R_P$ and the heat-sensitive resistance element has a resistance value $R_T$, the voltage (Vo1) of one heat-sensitive resistance element in the case of the first voltage extraction mode is given by "$VCC \times 2R_T/(R_P+2R_T)$" while the voltage (Vo2) of the other heat-sensitive resistance element is by "$VCC \times R_T/(R_P+2R_T)$".

Accordingly, when the two heat-sensitive resistance elements are normally operating (no occurrence of disconnection or short circuit failure), the voltages extracted in the first and extraction mode have a ratio matching a ratio of the foregoing two equations (Vo1:Vo2), i.e. "1:2". Thus, the two heat-sensitive resistance elements can be positively determined for a presence or absence of failure.

Meanwhile, in the case of separately providing a unit accommodating a heater and two heat-sensitive resistance elements and a unit accommodating a pull-up or pull-down resistance, extraction mode executing means and determining means and thereby connecting between these with a wire line, it is satisfactory to provide at least a first line connecting between the pull-up or pull-down resistance and one of the heat-sensitive resistance elements and a second line connecting between the other end of the one heat-sensitive resistance element and extraction mode executing means. Thus, the number of lines can be reduced as compared to the prior art (see FIG. 14). Meanwhile, because of selective execution of first and second extraction modes, it is also possible to reduce the number of pull-up or pull-down resistances.

Meanwhile, according to a preferred embodiment of the invention, provided that the power source is VCC, one of the pull-up resistance and the pull-down resistance has a resistance value RP, and the two voltages extracted in the first extraction mode are respectively Vo1 and Vo2, a resistance value of the heat-sensitive resistance element of upon executing the second extraction mode by an equation "$R_P \times (Vo1-Vo2)/(VCC-Vo1)$".

According to tis embodiment, by the equation "$R_P \times (Vo1-Vo2)/(VCC-Vo1)$", it is possible to determine a correct resistance value of the heat-sensitive resistance element taken account of a ground potential difference. There is no need of providing a ground line between the two units, hence further making possible to reduce the number of lines.

DETAILED DESCRIPTION OF THE INVENTION

Now, embodiments of the present invention will be explained on the basis of the drawings. Note that particulars of various details or examples and the exemplifications of numerals or character strings or other symbols are merely references for clarifying the idea of the present invention. It is apparent that all the part or one part of those does not limit the idea of the invention. Meanwhile, detailed explanation is omitted for a well-known technique, well-known procedure, well-known architecture and well-known circuit configuration (hereinafter, "well-known matters"). This is in order to simplify explanation, i.e. not to intentionally exclude all or one part of those well-known matters. The well-known matters could have been known by the person skilled in the art at the time of the present invention, and hence naturally included in the following explanation.

<First Embodiment>

Figure 1:
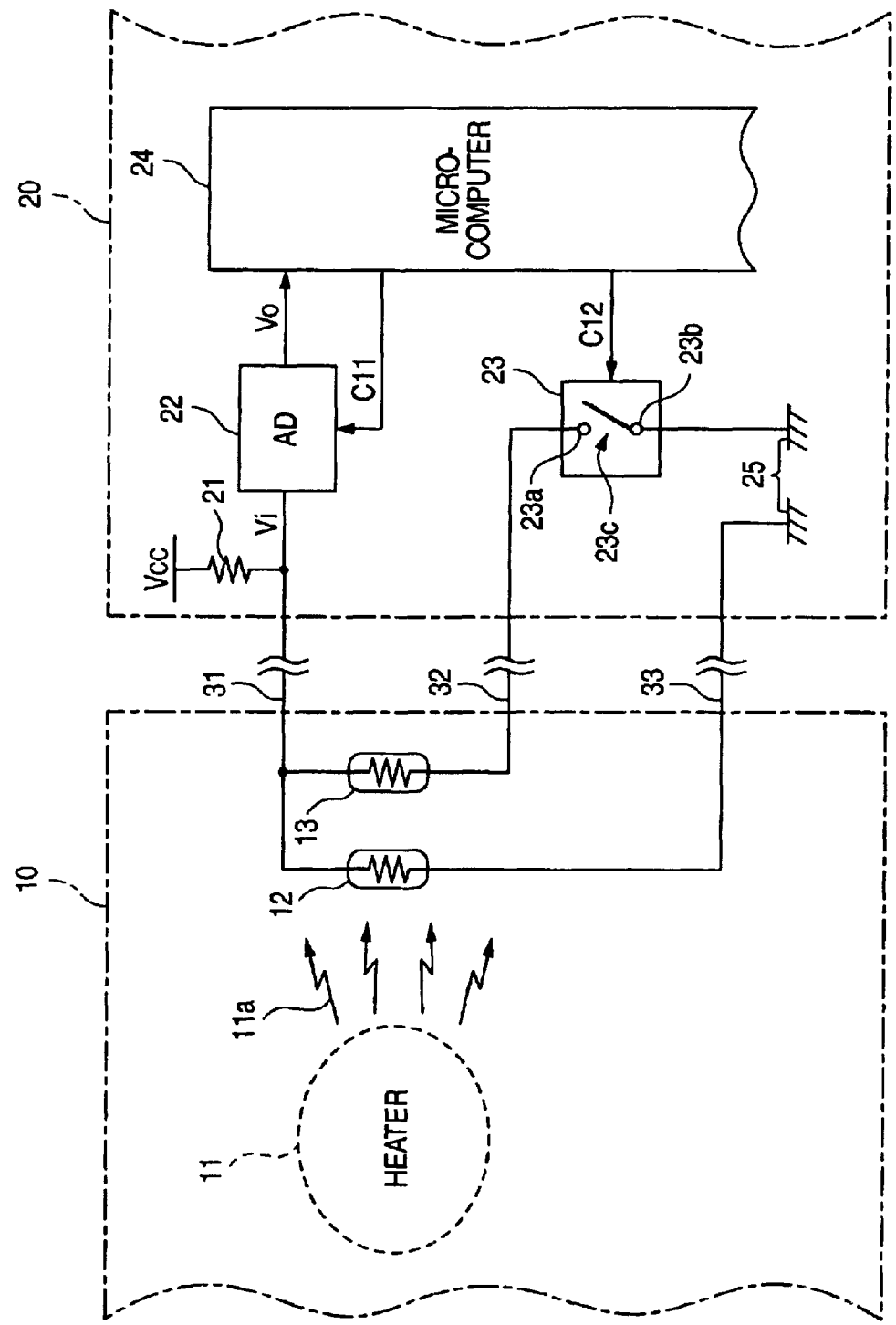
FIG. 1 is a configuration diagram in a first embodiment.

FIG. 1 is a configuration diagram of this embodiment, wherein 10 is a power unit and 20 is a control unit. The power unit 10 includes a heater 11, such as a power transistor, and two heat-sensitive resistance elements 12, 13 arranged on a side thereof. The control unit 20 includes a pull-up resistance 21, an AD converter 22, a switch element 23 and a microcomputer 24, each one in the number.

The two heat-sensitive resistance elements 12, 13 are elements having a resistance value to change sensitive to heat and uniform in characteristic to a possible extent. Although these may use, on principle, any of a linear output element (e.g. platinum ohmmeter) and a non-linear output element (e.g. thermistor), it is preferred to use a non-linear output element such as a thermistor in respect of cost. Meanwhile, two kinds of temperature characteristics are available for these elements, i.e. the type having a resistance value decreasing as temperature rises (negative characteristic) and the type reverse thereto (positive characteristic), any one of which may be used.

Figure 2A:
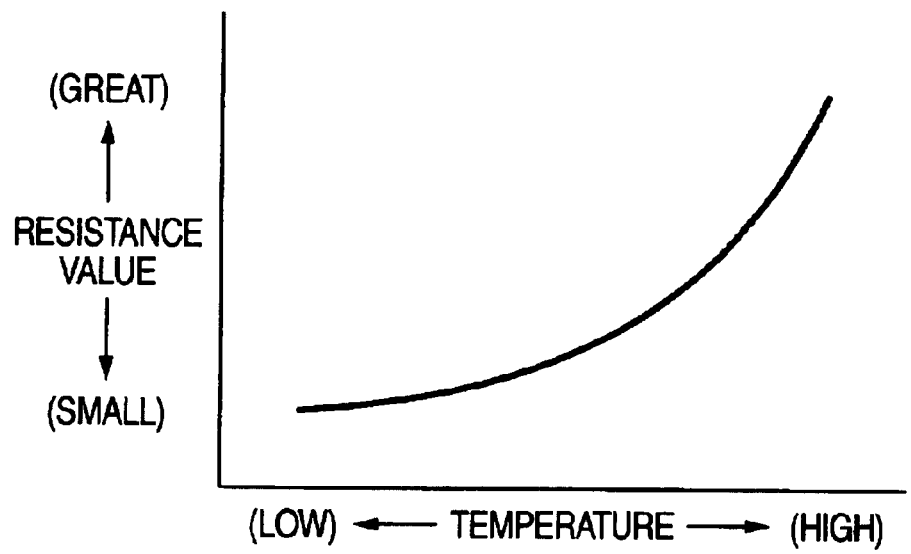
FIGS. 2A and 2B are temperature characteristic diagrams of non-linear output elements.
Figure 2B:
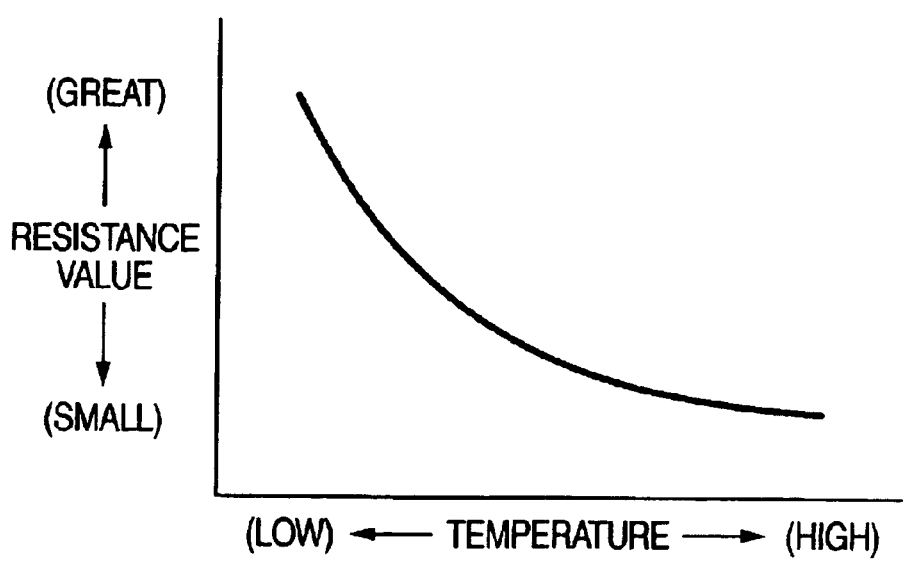

FIGS. 2A and 2B are temperature characteristic diagrams of a non-linear output elements wherein FIG. 2A is of a positive characteristic type while FIG. 2B is of a negative characteristic type. Hereinafter, the negative type having a non-linear output is assumably used for the convenience of explanation. Namely, the two heat-sensitive resistance elements 12, 13 are sensitive to the heat 11a of the heater 11 and changing its resistance value on the negative characteristic. Furthermore, unless there is a failure such as disconnection or short-circuit on the element, the resistance value changes in the same characteristic. Hereinafter, the two heat-sensitive resistance elements 12, 13 are respectively referred to as a first heat-sensitive resistance element 12 and a second heat-sensitive resistance element 13.

Three lines 31–33 are laid between the power unit 10 and the control unit 20. The first and second heat-sensitive resistance elements 12, 13 have respective one ends (upper in the figure) connected together at within the power unit 10. The connection point is drawn to the control unit 20 through the line 31, and connected to an input terminal of an AD converter 22 and to a power source VCC through a pull-up resistance 21. Meanwhile, the other end (lower in the figure) of the first heat-sensitive resistance element 12 is connected to an upper end 23a of the switch element 23 of the control unit 20 through the line 32. The other end (lower in the figure) of the second heat-sensitive resistance element 13 is connected to a ground 25 of the control unit 20 trough the line 33.

The AD converter 22 has an output terminal connected to an input port of the microcomputer 24. The switch element 23 has a lower terminal 23b connected to the ground 25. The AD converter 22, in a duration the control signal C11 outputted from the microcomputer 24 is active, converts an input voltage Vi into a digital signal Vo and outputs it. The switch element 23, in a duration that the control signal C12 outputted from the microcomputer 24 is active, closes its contact 23c and connects between the upper terminal 23a and the lower terminal 23b.

Now, the operation is explained.

If it is now assumed that the control signal C12 is inactive, the switch element 23 is open at its contact 23c. Hence, there is no connection between the upper terminal 23a and the lower terminal 23b, i.e. between the other end of the second heat-sensitive resistance element 13 and the ground 25. In this case, the presence of the second heat-sensitive resistance element 13 can be ignored.

Figure 3A:
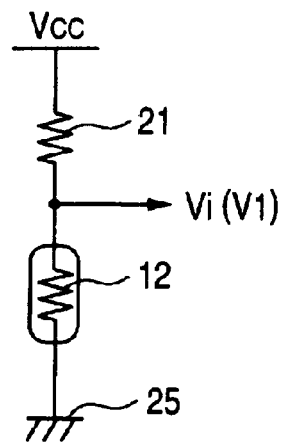
FIGS. 3A and 3B are typical diagrams when a control signal C12 is inactive and active.

FIG. 3A is a typical diagram showing this state (the state control signal C12 is inactive). The first heat-sensitive resistance element 12 is connected, at its one end, to the power source VCC through the pull-up resistance 21 and, at the other end, to the ground 25. Herein, provided that the pull-up resistance 21 has a resistance value $R_P$ and the first heat-sensitive resistance element 12 has a resistance value $R_T$, the end-to-end voltage (Vi) of the first heat-sensitive resistance element 12 is given by the following.

$$Vi = VCC \times R_T / (R_P + R_T) \qquad (1)$$

Meanwhile, in the duration the control signal C12 is active, the switch element 23 is closed at its contact 23c, resulting in a connection between the upper terminal 23a and the lower terminal 23b, i.e. between the other end of the second heat-sensitive resistance element 13 and the ground 25. In this case, the first heat-sensitive resistance element 12 and the second heat-sensitive resistance element 13 are in a state of parallel connection.

Figure 3B:
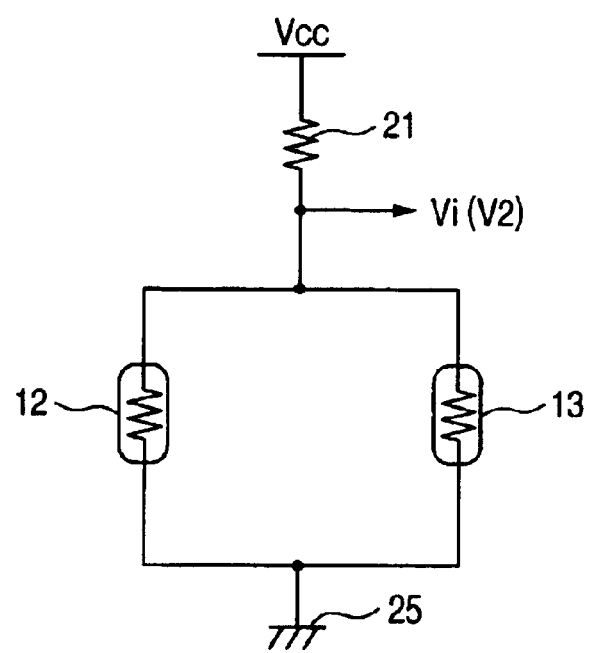

FIG. 3B is a typical diagram showing this state (the state control signal C12 is active). The first heat-sensitive resistance element 12 and the second heat-sensitive resistance element 13 are in parallel connection, one end of which is connected to the power source VCC through the pull-up resistance 21 while the other end is connected to the ground 25.

In the case that the first heat-sensitive resistance element 12 and the second heat-sensitive resistance element 13 are in normal operation (free from disconnection or short circuit failure), these two elements are uniform. Accordingly, the resistance value ($R_{T1}$ for convenience) of the first heat-sensitive resistance element 12 and the resistance value ($R_{T2}$ for convenience) of the second heat-sensitive resistance element 13 are equal to each other. Provided that "$R_{T1}=R_{T2}=R_P$", the first heat-sensitive resistance element 12 and second heat-sensitive resistance element 13 has an end-to-end voltage (Vi) given by the following.

$$Vi = VCC \times R_T/(2R_P + R_T) \quad (2)$$

Herein, provided that Vi in FIG. 3A is "V1" and Vi in FIG. 3B is "V2", the ratio of V1 and V2 (V1:V2) is a ratio of the Equations (1) and (2) that is given by the following.

$$V1:V2 = VCC \times R_T/(R_P + R_T) : VCC \times R_T/(2R_P + R_T) \quad (3)$$
$$= 1/(R_P + 2R_T) : 1/(2R_P + R_T)$$

Hereinafter, "$1/(R_P+R_T)$" is expressed as "$\alpha$" while "$1/(2R_P+R_T)$" is expressed as "$\beta$", in order to simplify explanation.

Because of the above, when actually detecting a temperature, the control signal C12 is repeatedly made inactive (operation in FIG. 3A) and active (operation in FIG. 3B) at a regular or irregular interval, to measure Vi (V1 and V2) in the respective cases. In case the ratio of V1 and V2 matches the ratio ($\alpha$:$\beta$) in the Equation (3), normal operation can be determined on the first heat-resistive resistance element 12 and second heat-resistive resistance element 13. In case it is out of matching, abnormal operation (operation with disconnection or short circuit failure) can be determined. Note that "matching" does not mean a coincidence in an exact sense. It rather means a coincidence satisfactorily within a suitable marginal range taken account of device variation and measurement errors.

Figure 4:
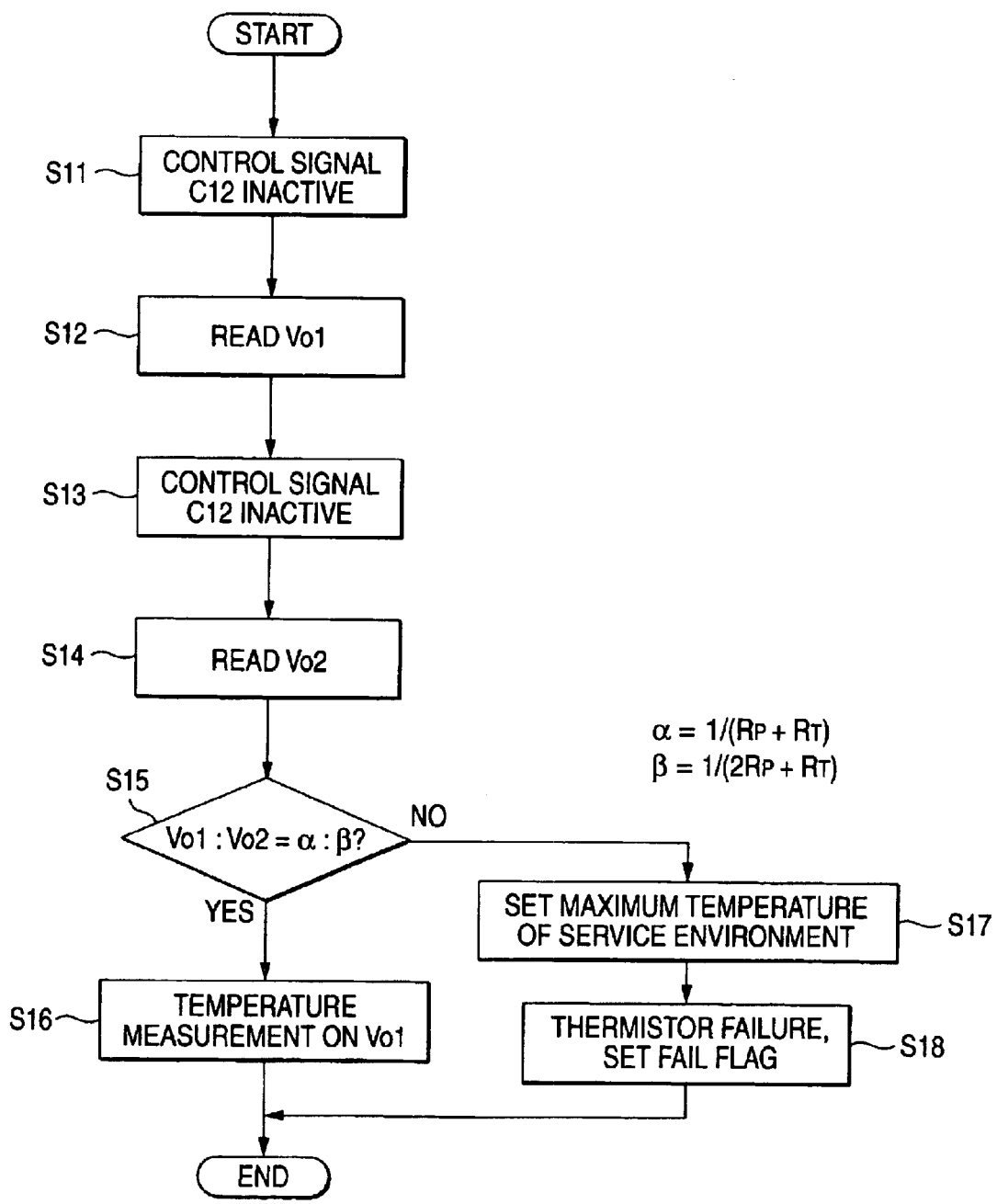
FIG. 4 is a flowchart of a program essential part to be repetitively executed with a predetermined period within a microcomputer 24.

FIG. 4 is a flowchart of a program essential part to be repetitively executed with a predetermined period within the microcomputer 24. In this program, the control signal C12 is first made inactive for a predetermined time, to take the circuit configuration of FIG. 3A (step S11). In this duration, the control signal C11 is made active to operate the AD converter 22, thereby converting Vi into a digital signal Vo and capturing Vo as "V1" (step S12).

Then, the control signal C12 is made active for a predetermined time, to take the circuit configuration of FIG. 3B (step S13). In this duration, the control signal C11 is again made active to operate the AD converter 22, thereby converting Vi into a digital signal Vo and capturing Vo as "V2" (step S14).

Figure 5:
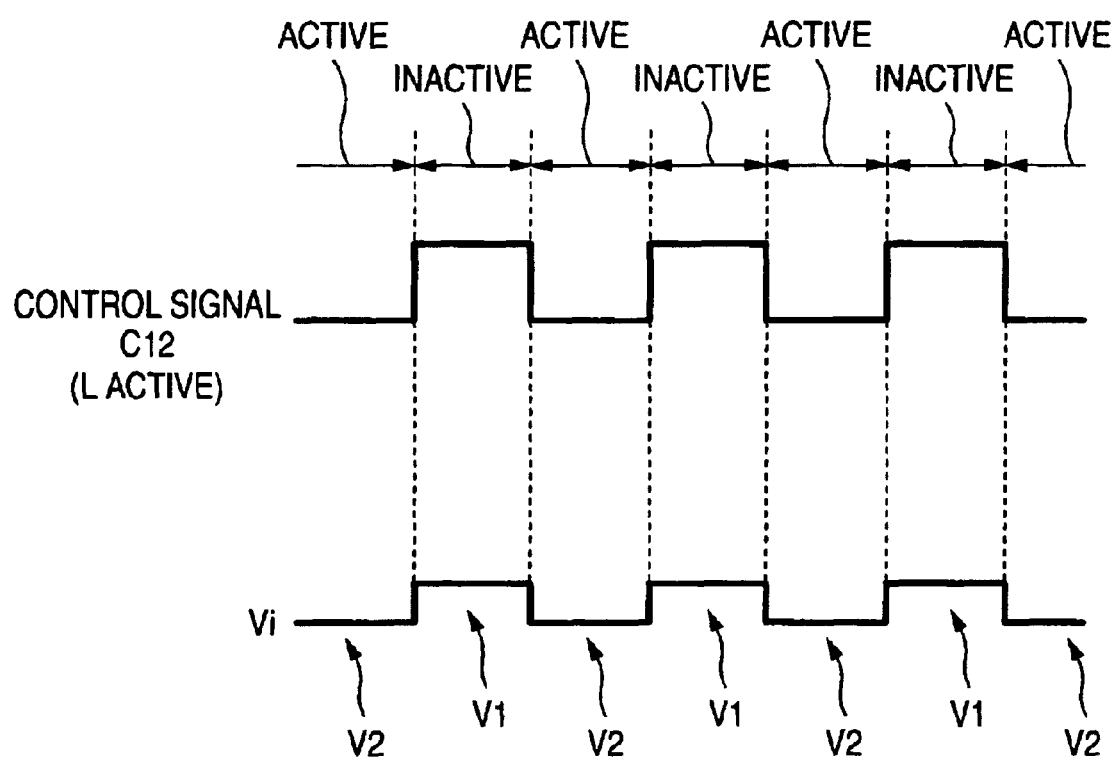
FIG. 5 is a correspondence chart of between the inactive/active timing of the control signal C12 and the capture timing of Vi.

FIG. 5 is a corresponding chart of between the inactive/active timing of control signal C12 and the capture timing of Vi. Vi that the control signal C12 is made inactive is captured as "V1" while Vi that the control signal C12 is made active is captured as "V2".

Then, determination is made as to whether or not the ratio of V1 and V2 matches "$\alpha$:$\beta$" (step S15). Note that "matching" does not mean a coincidence in an exact sense, as already mentioned. It rather means a coincidence satisfactorily within a suitable marginal range taken account of device variation and measurement errors.

In the case the ratio of V1 and V2 matches "$\alpha$:$\beta$", the first heat-sensitive resistance element 12 and the second heat-sensitive resistance element 13 are determined both in normal operation. Vi captured upon the circuit configuration of FIG. 3A (i.e. "V1") is used to measure a temperature of the heater 11 (step S16).

On the other hand, in the case the ratio of V1 and V2 does not match "$\alpha$:$\beta$", it is determined that a failure such as disconnection or short circuit occurs in any one or both of the first heat-sensitive resistance element 12 and the second heat-sensitive resistance element 13. In this case, Vi captured upon the circuit configuration of FIG. 3A (i.e. "V1") is not reliable, the maximum temperature in a service environment for example is "considered as" a heat of the heater 11 and employed (step S17). Furthermore, a required fail process is executed, e.g. raising a flag representative of a failure of the thermistor (first heat-sensitive resistance element 12 or second heat-sensitive resistance element 13) (step S18).

In this manner, in this embodiment, the control signal C12 is made inactive to capture Vi at that time as "V1" while the control signal C12 is made active to capture Vi at that time as "V2". Determination is made as to whether or not the ratio of V1 and V2 matches a predetermined ratio ($\alpha$:$\beta$), thereby making it possible to correctly decide a good/poor operation of the first heat-sensitive resistance element 12 and second heat-sensitive resistance element 13. Accordingly, besides a disconnection failure in the first heat-sensitive resistance element 12 and second heat-sensitive resistance element 13 as a matter of course, a short circuit failure whose symptom gradually proceeds can be sensed swiftly, enabling for effecting a required fail countermeasure. For example, where applied to a vehicular power-operated steering system, it can contribute to the reliability improvement of the system.

In the meanwhile, the problem of the invention lies in "providing a temperature detecting device capable of reducing manufacturing cost by decreasing the number of lines between a control unit and a power unit, the number of pull-up resistance within the control unit, or the number of AD converters within the control unit".

Figure 14:
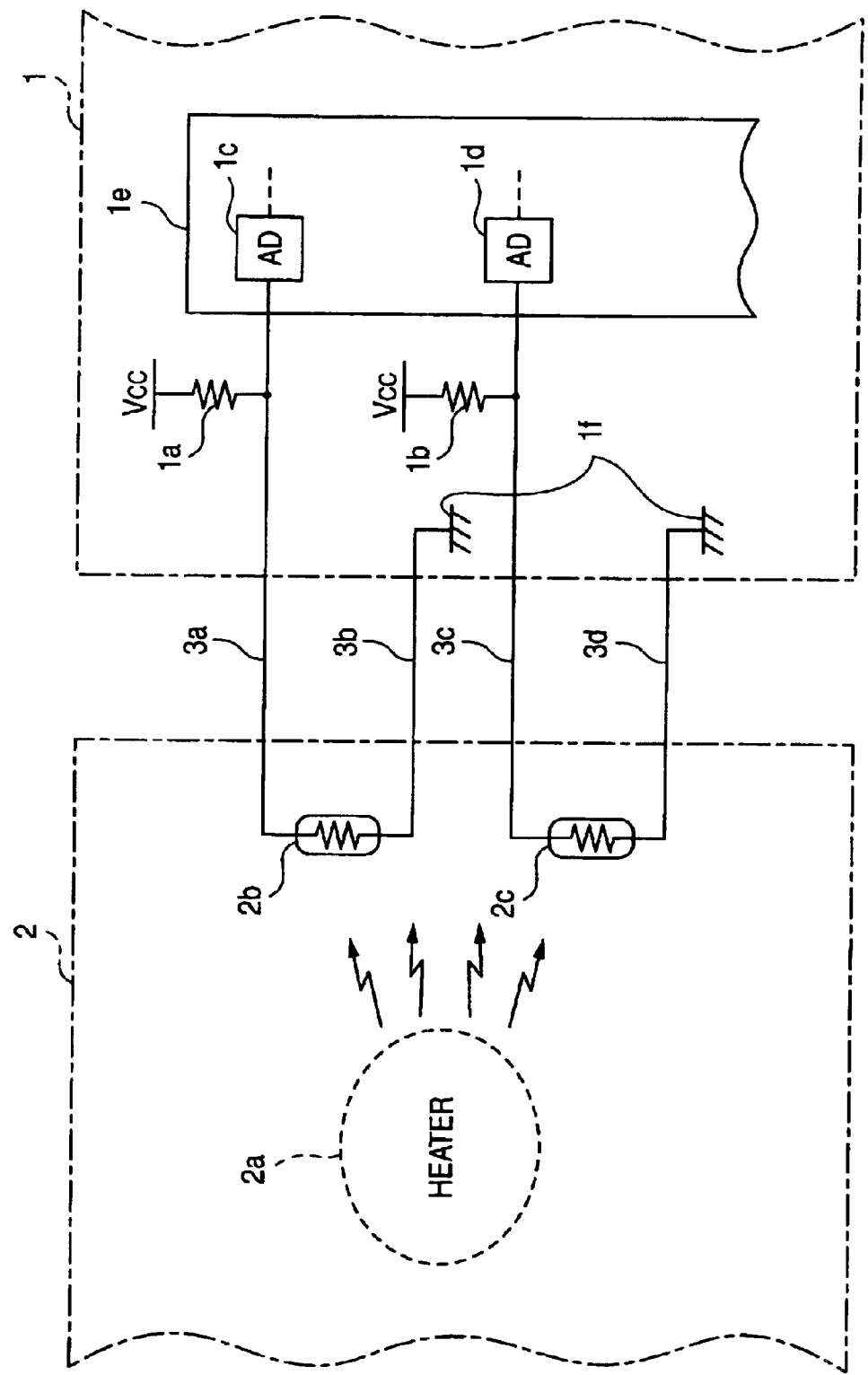
FIG. 14 is an essential-part connection diagram of a control unit 1 and a power unit 2.

Comparing between the prior art (see FIG. 14) and the present embodiment (see FIG. 1), the present embodiment has lines 31–33 in the number of three (four in the prior art). Thus, the effect of reduction by one line is obtainable. Meanwhile, because the present embodiment has one pull-up resistance 21 (two in the prior art), the effect of reducing by one can be obtained here. Furthermore, because the present embodiment has one AD converter 22 (two in the prior art), the effect of reducing by one can be obtained here. Accordingly, the present embodiment can reduce any of the lines, the pull-up resistances and AD converters, thus making it possible to reduce manufacturing cost and achieving the problem of the invention.

<Modification to First Embodiment>

The first embodiment was of the pull-up scheme, i.e., three lines 31–33 are laid between the power unit 10 and the control unit 20, the first and second heat-sensitive resistance elements 12, 13 at their one ends (upper end in the figure) being connected together within the power unit 10, the connection point of which is drawn to the control unit 20 through the line 31 and connected to the input terminal of the AD converter 22 and to the power source VCC through the pull-up resistance 21, the other end (lower end in the figure) of the first heat-sensitive resistance element 12 being connected to the upper terminal 23a of the switch element 23 of the control unit 20 through the line 32 while the other end (lower end in the figure) of the second heat-sensitive resistance element 13 being connected to the ground 25 of the control unit 20 through the line 33. However, the invention is not limited to this but may employ a pull-down scheme.

Figure 6:
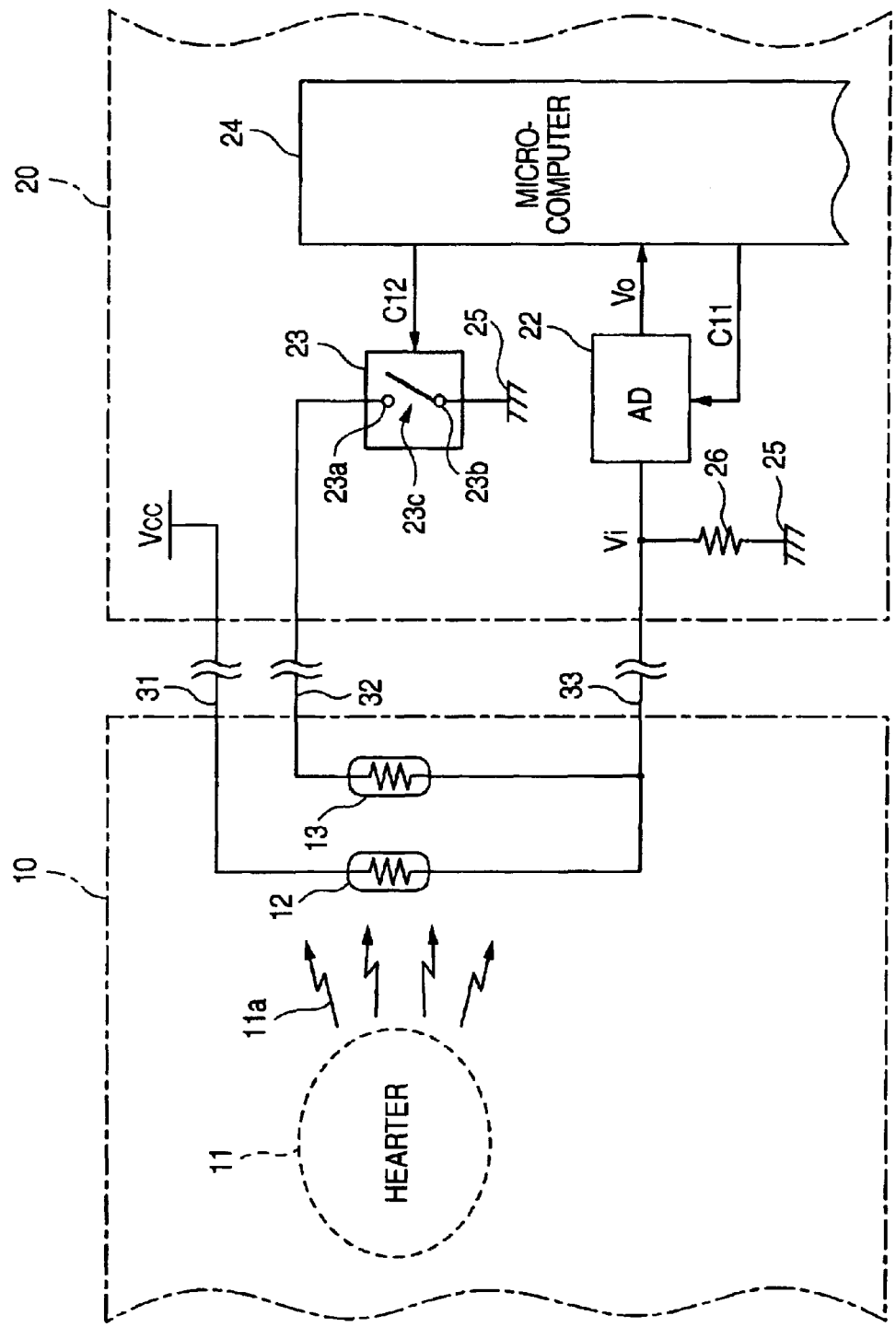
FIG. 6 is a diagram showing a modification of the first embodiment.

FIG. 6 shows a modification to the first embodiment, which is an example employing the pull-down scheme. In this figure, three lines 31–33 are laid between a power unit 10 and a control unit 20. First and second heat-sensitive resistance elements 12, 13 have the other ends (lower ends in the figure) connected together within the power unit 10. The connection point is drawn to the control unit 20 through the line 33 and connected to an input terminal of an AD converter 22 and to the ground 25 through a pull-down resistance 26. Meanwhile, the first heat-sensitive resistance element 12 has one end (upper end in the figure) connected to a power source VCC of the control unit 20 through the line 31. The second heat-sensitive resistance element 13 has one end (upper end in the figure) connected to an upper terminal 23a of a switch element 23 through the line 32.

The output terminal of the AD converter 22 is connected to an input port of the microcomputer 24 while the lower terminal 23b of the switch element 23 is connected to the ground 25. The AD converter 22, in a duration that the control signal C11 outputted from the microcomputer 24 is active, converts an input voltage Vi into a digital signal Vo and outputs it. The switch element 23, in a duration that the control signal C12 outputted from the microcomputer 24 is active, closes its contact 23c and connects between the upper terminal 23a and the lower terminal 23b.

In this configuration, the control signal C12 is made inactive to capture Vi at that time as "V1" while the control signal C12 is made active to capture Vi at that time as "V2". By determining whether or not the ratio of V1 and V2 matches a predetermined ratio ($\alpha:\beta$), the first heat-sensitive resistance element 12 and the second heat-sensitive resistance element 13 can be accurately determined for good/ poor in operation. Accordingly, besides a disconnection failure in the first heat-sensitive resistance element 12 and second heat-sensitive resistance element 13 as a matter of course, a short circuit failure whose symptom gradually proceeds can be sensed swiftly, enabling to take a required fail countermeasure. For example, where applied to a vehicular power-operated steering system, it can contribute to the reliability improvement of the system.

Meanwhile, comparing between the prior art (see FIG. 14) and the present modification (see FIG. 6), the present modification has three lines 31–33 (four lines in the prior art). Thus, the effect of reduction by one line is obtainable. Meanwhile, because the present modification has one pull-down resistance 26 (two in the prior art; though pull-up resistances), the effect of reducing by one can be obtained here. Furthermore, because the present modification has one AD converter 22 (two in the prior art), the effect of reducing by one can be obtained here. Accordingly, the present modification can reduce any of the lines, the pull-down resistances and AD converters, thus making it possible to reduce manufacturing cost and achieving the problem of the invention.

<Second Embodiment>

Figure 7:
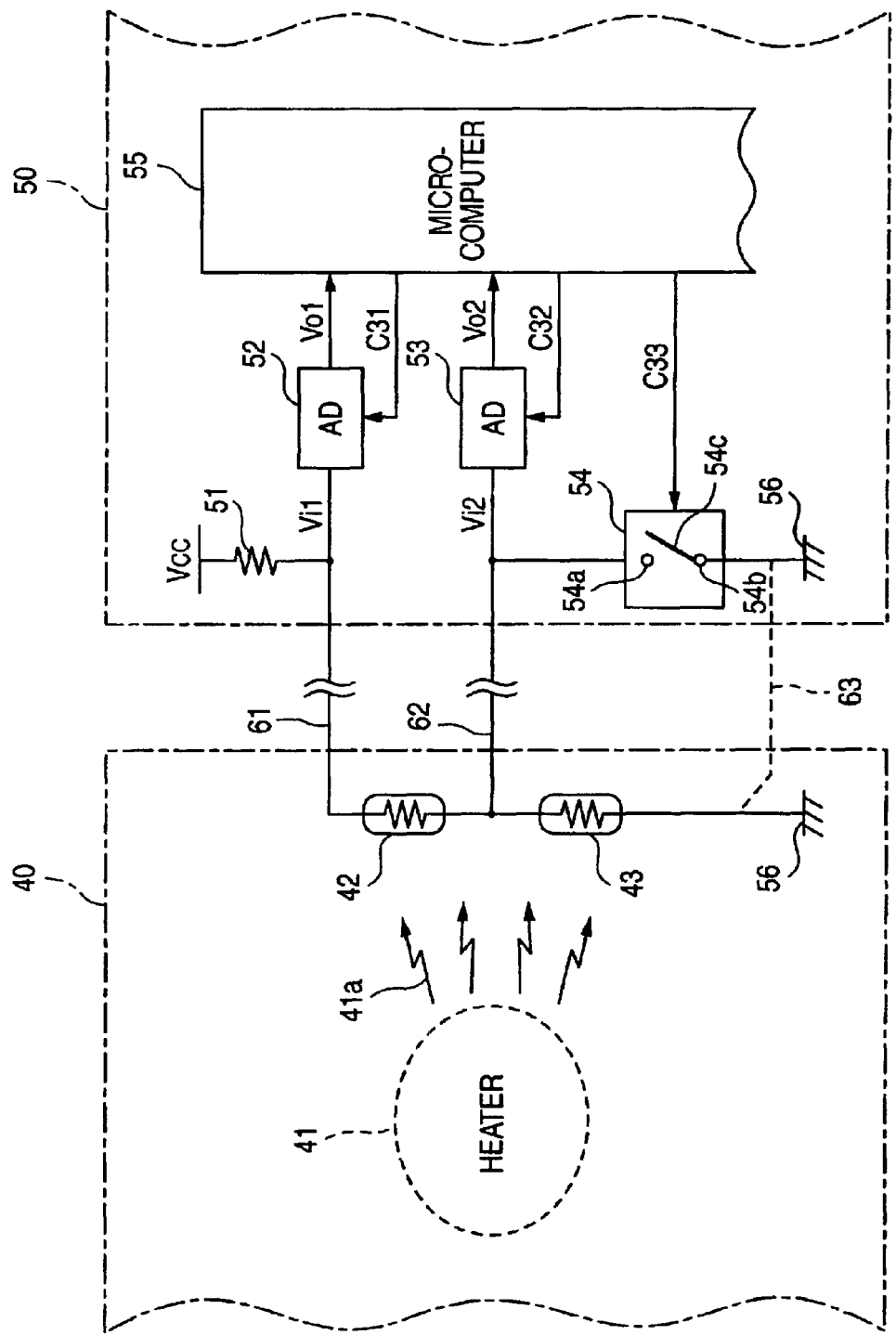
FIG. 7 is a configuration diagram in a second embodiment.

FIG. 7 is a configuration diagram of this embodiment, wherein 40 is a power unit and 50 is a control unit. The power unit 40 includes a heater 41, such as a power transistor, and two heat-sensitive resistance elements 42, 43 arranged on a side thereof. The control unit 50 includes one pull-up resistance 51, two AD converters 52, 53, one switch element 54 and microcomputer 55.

The two heat-sensitive resistance elements 42, 43 are elements having a resistance value to change sensitive to heat and uniform in characteristic to a possible extent. Although these may use, on principle, any of a linear output element (e.g. platinum ohmmeter) and a non-linear output element (e.g. thermistor), it is preferred to use a non-linear output element such as a thermistor in respect of cost. Meanwhile, two kinds of temperature characteristics are available for these elements, i.e. the type having a resistance value decreasing as temperature rises (negative characteristic) and the type reverse thereto (positive characteristic), any one of which may be used. Hereinafter, the two heat-sensitive resistance elements 42, 43 are respectively referred to as a first heat-sensitive resistance element 42 and a second heat-sensitive resistance element 43.

Two lines 61, 62 are laid between the power unit 40 and the control unit 50. The first heat-sensitive resistance element 42 and the second heat-sensitive resistance element 43 are connected in series. The series circuit has one end (upper end in the figure) drawn to the control unit 50 through the line 61, and connected to an input terminal of one AD converter 52 and to a power source VCC through a pull-up resistance 51. Meanwhile, the other end (lower in the figure) of the series circuit is connected to a ground 44 of the power unit 40. Furthermore, the series connection point is drawn to the control unit 50 through the line 62, and connected to an input terminal of the other AD converter 53 and to the upper terminal 54a of the switch element 54.

Figure 9:
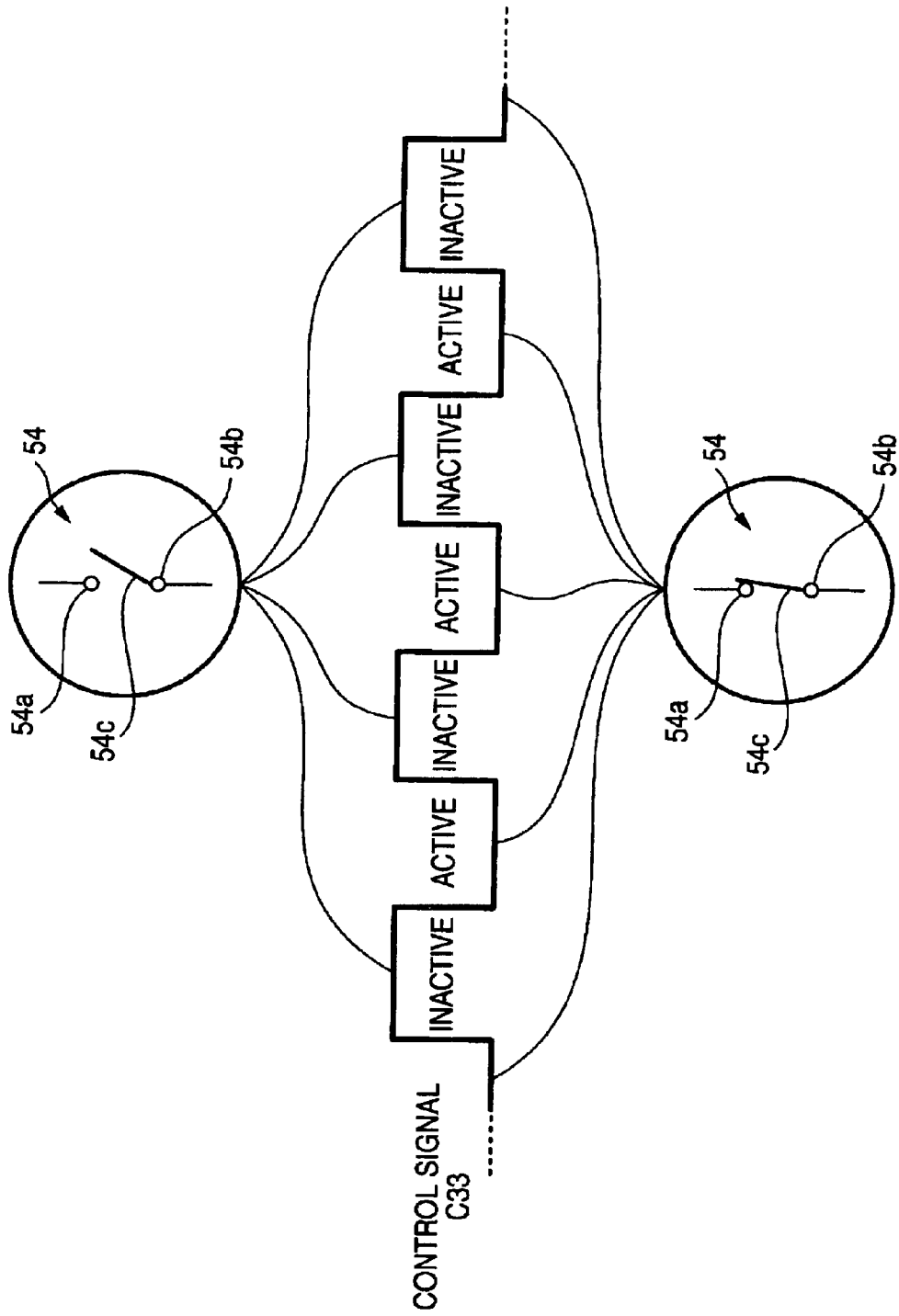
FIG. 9 is an operation explanatory figure of a switch element 54.

The two AD converters 52, 53 have respective output terminals connected to two input ports of the microcomputer 55. The switch element 54 has a lower terminal 54b connected to the ground 56 of the control unit 50. The one AD converter 52, in a duration that the control signal C31 outputted from the microcomputer 55 is active, converts an input voltage Vi1 into a digital signal Vo1 and outputs it. Likewise, the other AD converter 53, in a duration that the control signal C32 outputted from the microcomputer 55 is active, converts an input voltage Vi2 into a digital signal Vo2 and outputs it. The switch element 54, in a duration that the control signal C33 outputted from the microcomputer 55 is active, closes its contact 54c to connect between the upper terminal 54a and the lower terminal 54b, as shown in FIG. 9.

Now, the operation is explained.

In case it is now assumed that the control signal C33 is inactive, the switch element 54 is open at its contact 54c. Hence, there is no connection between the upper terminal 54a and the lower terminal 54b, i.e. between the other end of the first heat-sensitive resistance element 42 and the ground 56 of the control unit 50.

Figure 8A:
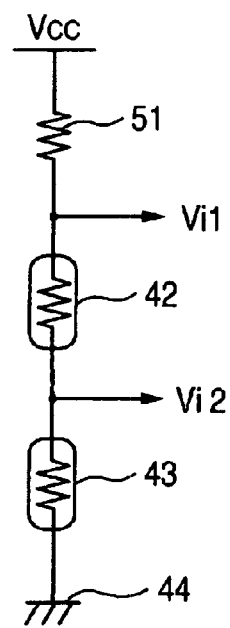
FIGS. 8A and 8B are typical diagrams when the control signal C33 is inactive and active.
Figure 8B:
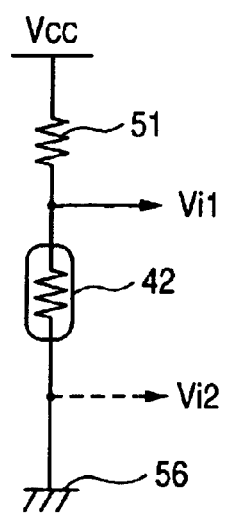

FIG. 8A is a typical diagram in the state the control signal C33 is inactive while FIG. 8B is a typical diagram in the state the control signal C33 is active. Provided herein that the pull-up resistance 51 has a resistance value $R_P$ and the first and second heat-sensitive resistance elements 42, 43 have a resistance value $R_T$, the input voltage (Vi1) of one AD converter 52 when the control signal C33 is inactive (when in FIG. 8A) and the input voltage (Vi2) of the other AD converter 53 are respectively given by the following equations.

$$Vi1 = VCC \times 2R_T/(R_P + 2R_T) \tag{4}$$

$$Vi2 = VCC \times R_T/(R_P + 2R_T) \tag{5}$$

Herein, the ratio of Vi1 and Vi2 (Vi1:Vi2) is a ratio of the equations (4) and (5), i.e., $$Vi1 : Vi2 = VCC \times 2R_T / (R_P + 2R_T) : VCC \times R_T / (R_P + 2R_T) \tag{6}$$
$$= 1 : 2$$

Accordingly, when actually detecting a temperature, the control signal C33 is repeatedly made inactive and active at a regular or irregular interval to thereby measure Vi1 and Vi2. In case the ratio of Vi1 and Vi2 matches the ratio (1:2) in the Equation (6), normal operation can be determined on the first heat-sensitive resistance element 42 and second heat-sensitive resistance element 43. Meanwhile, in case it is out of matching, abnormal operation (operation with disconnection or short circuit failure) can be determined. Note that "matching" does not mean a coincidence in an exact sense. It rather means a coincidence satisfactorily within a suitable marginal range taken account of device variation and measurement errors.

Comparing between the prior art (see FIG. 14) and the present embodiment (see FIG. 7), the present embodiment has two lines 61, 62 (four lines in the prior art). Thus, the effect of reduction by two lines is obtainable. Meanwhile, because the present embodiment has one pull-up resistance 51 (two in the prior art), the effect of reducing by one can be obtained here. Accordingly, the present embodiment can reduce the number of lines and pull-up resistances, thus making it possible to reduce manufacturing cost and achieving the problem of the invention.

Herein, the effect of reducing the lines in this embodiment was obtained by connecting the other end of the second heat-sensitive resistance element 43 to the ground 44 of the power unit 44. Namely, in FIG. 7, usually connection is to be provided by a line 63 between the other end of the second heat-sensitive resistance element 43 and the ground 56 of the control unit 50. Instead, the present embodiment omitted the line 63 by "connecting the other end of the second heat-sensitive resistance element 43 to the ground 44 of the power unit 44" on the premise "the ground 44 for the power unit 40 and the ground 56 for the control unit 50 are in the same level".

The above promise, i.e. "the ground 44 for the power unit 40 and the ground 56 for the control unit 50 are in the same level" is correct in a general sense. However, this is not always correct. The ground 44 for the power unit 40 and the ground 56 for the control unit 56 are connected to a not-shown ground member (body or the like). However, the ground member possesses a resistance though slight in extent. In the case the current flowing to the ground member is great in amount, potential unbalance takes place between the connection points to the ground member. For example, even where the ground 56 of the control unit 50 has a potential of 0 V, the other ground point, particularly the ground 56 of the power unit 40, possibly has a potential exceeding 0 V or below 0 V. The variation in ground potential, even if slight, must be eliminated because it can be responsible for losing the reliability on temperature measurement values of this embodiment.

Accordingly, in order to eliminate such a disadvantage, the present embodiment executes the following Equation (7) within the microcomputer 55, to determine a correct resistance value $R_{T1}$ of the first heat-sensitive resistance element 42 taken account of the differences in ground potential.

$$R_{T1}=R_P \times (Vo1-Vo2)/(VCC-Vo1) \quad (7)$$

where $R_P$ is the resistance value of the pull-up resistance 51.

Vo1 and Vo2 are respectively output voltages of the two AD converters 52, 53 when the switch element 54 is open at its contact 54c. In this case (when the switch element 54 is open at the contact 54c), provided that the current flowing through the first heat-sensitive resistance element 42 has a value $I_{T1}$, Vo1 is given by the following.

$$Vo1=(I_{T1} \times R_{T1})+Vo2 \quad (8)$$

Furthermore, because of $$VCC=(I_{T1} \times R_P)+Vo1 \quad (9),$$

we obtain $$I_{T1}=(VCC-Vo1)/R_P \quad (10).$$

From the above, the following is given.

$$Vo1=R_{T1} \times (VCC-Vo1)/R_P+Vo2 \quad (11)$$

Thus, we can derive the foregoing Equation (7).

In this manner, the use of Equation (7) makes it possible to determine a correct resistance value $R_{T1}$ (resistance value of the first heat-sensitive resistance element 42) taken account of a difference in grounding potential. Accordingly, by making a temperature conversion using the resistance value $R_{T1}$, eliminated is the problem of potential imbalance between the ground 44 of the power unit 40 and the ground 56 of the control unit 50, thus allowing correct temperature measurement.

Figure 10:
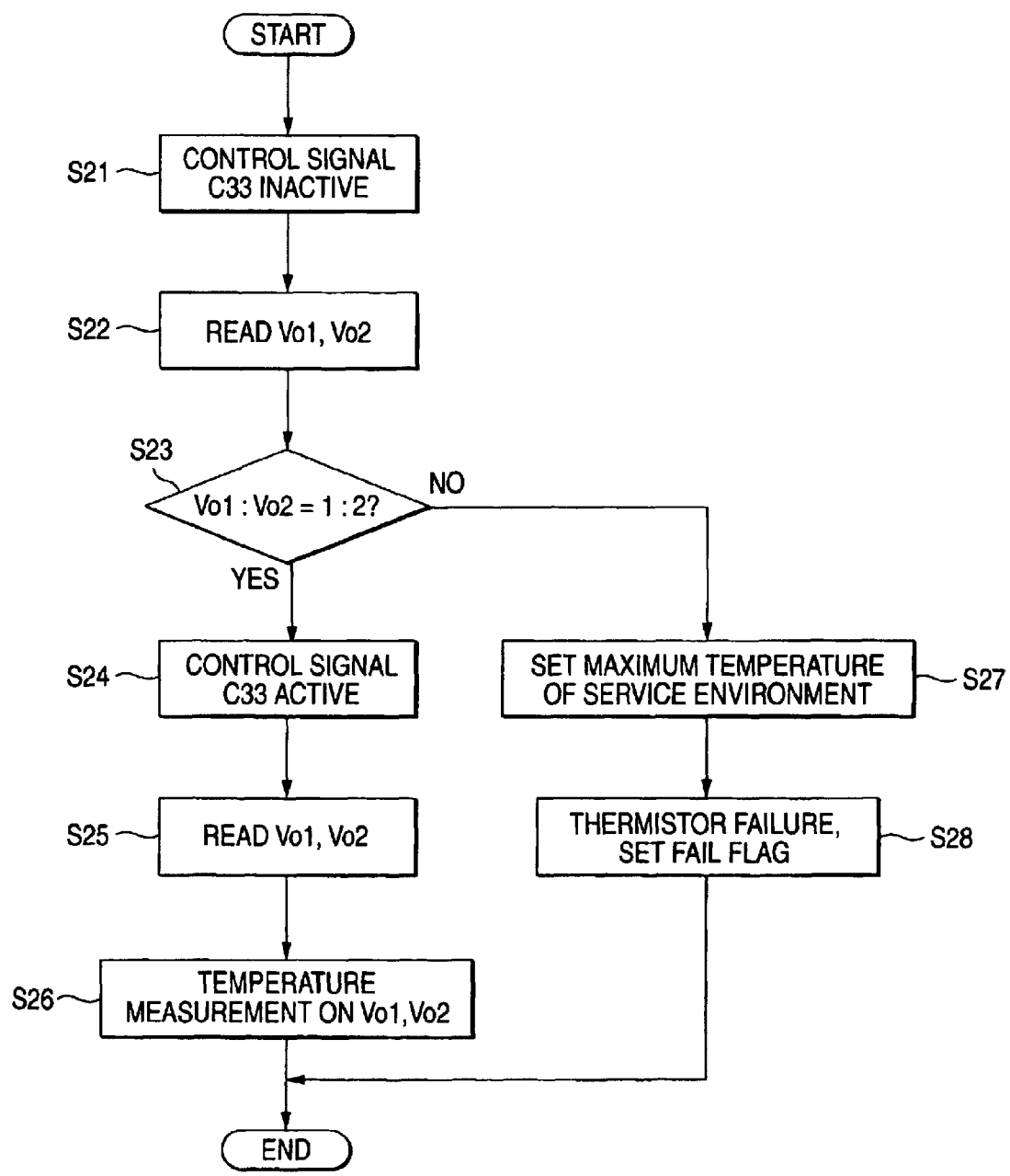
FIG. 10 is a flowchart of a program essential part to be repetitively executed with a predetermined period within a microcomputer 55.

FIG. 10 is a flowchart of a program essential part to be repeatedly executed with a predetermined period within the microcomputer 55. In this program, the control signal C33 is first made inactive for a predetermined time thereby taking the circuit configuration of FIG. 8A (step S21). In this duration, the control signals C31 and C32 are made active to operate the AD converters 52, 53 thereby converting Vi1 and Vi2 into digital signals Vo1, Vo2 and capturing those (step S22).

Then, determination is made as to whether or not the ratio of Vo1 and Vo2 matches the ratio in the foregoing Equation (7), i.e. "1:2" (step S23). Actually, the value that Vo2 is doubled is compared with the value Vo1. Namely, the equation "Vo1=2×Vo2" is evaluated. In case the result of evaluation is true, there is a matching. In case it is false, there is no matching. Note that, although mentioned before, "matching" does not mean coincidence in an exact sense. It rather means a coincidence satisfactorily within a suitable marginal range taken account of device variation and measurement errors.

When the ratio of Vo1 and Vo2 matches "1:2", the first heat-sensitive resistance element 42 and the second heat-sensitive resistance element 43 are determined both in normal operation. The control signal C32 is made active for a predetermined time, to take the circuit configuration of FIG. 8B (step S24). In this duration, the control signals C31 and C32 are again made active, to operate the AD converters 52, 53 thereby converting Vi1 and Vi2 into and capturing digital signals Vo1, Vo2 (step S25). Then, these Vo1, Vo2 are substituted into the foregoing Equation (7), to determine a correct resistance value $R_{T1}$ (resistance value of the first heat-sensitive resistance element 42) taken account of the differences in ground potential. By making a temperature conversion using the resistance value $R_{T1}$, carried out is a correct temperature measurement eliminated of the problem of potential imbalance between the ground 44 of the power unit 40 and the ground 56 of the control unit 50 (step S26).

Meanwhile, in the case the ratio of Vo1 and Vo2 does not match "1:2", it is determined that there is an occurrence of failure, such as disconnection or short circuit, in any one or both of the first heat-sensitive resistance element 42 and the first heat-sensitive resistance element 43. In this case, because Vo1, Vo2 is not reliable, the maximum temperature in service environment for example is "considered as" a heat of the heater 41 and employed (step S27). Furthermore, a required fail process is executed, e.g. raising a flag representative of a failure of the thermistor (first heat-sensitive resistance element 42 or second heat-sensitive resistance element 43) (step S28).

In this manner, this embodiment determines whether or not the ratio of Vo1 and Vo2 captured upon making the control signal C33 inactive matches a predetermined ratio (1:2), thereby making it possible to correctly determine a good/poor operation of the first heat-sensitive resistance element 42 and second heat-sensitive resistance element 43. Accordingly, besides a disconnection failure in the first heat-sensitive resistance element 42 and second heat-sensitive resistance element 43 as a matter of course, a short circuit failure whose symptom gradually proceeds can be sensed swiftly, enabling for taking a required fail countermeasure. For example, where applied to a vehicular power-operated steering system, it can contribute to the reliability improvement of the system. Moreover, the problem of ground potential imbalance can be eliminated by the Equation (7), allowing reliable temperature measurement.

Figure 11:
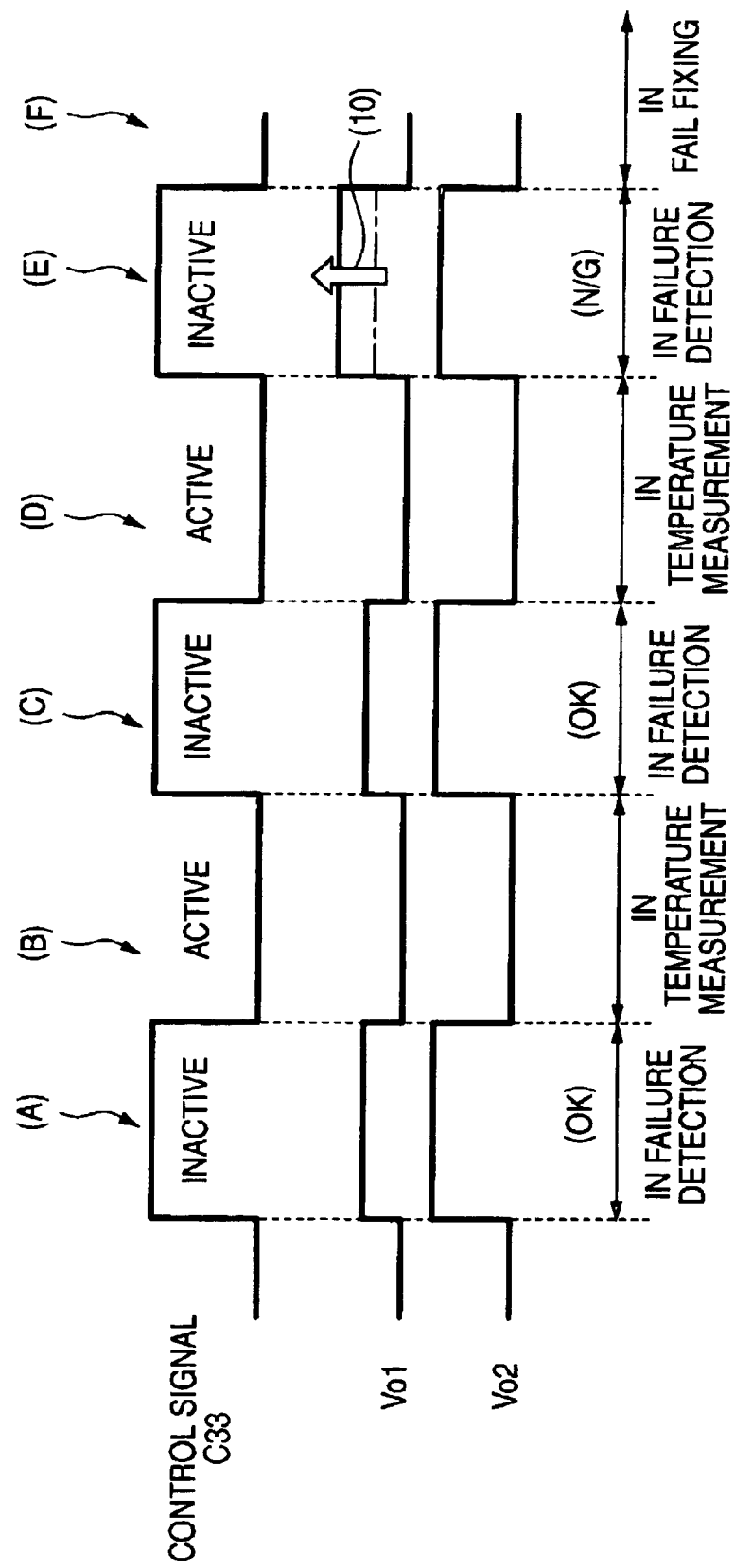
FIG. 11 is a time chart showing one example of temperature measurement in the second embodiment.

FIG. 11 is a time chart showing an example of temperature measurement in the present embodiment. The control signal C33 is repetitively made inactive and active at a predetermined time interval. The switch element 54 of the control unit 50 opens the contact 54*c* in the inactive period, and closes the contact 54*c* in the active period. The foregoing program (see FIG. 10) determines the first and second heat-sensitive resistance elements 42, 43 as normal in case Vo1 and Vo2 captured in the inactive period has a ratio matching a predetermined ratio (1:2). If not matching the same, determination is as abnormal. In FIG. 11, Vo1 and Vo2 captured in the inactive period (A) and (C) has a ratio matching the predetermined ratio (1:2). Accordingly, in this case, Vo1 and Vo2 are again captured in the subsequent active period (B) and (D). Furthermore, these Vo1 and Vo2 are substituted into the Equation (7), to determine a correct resistance value $R_{T1}$ (resistance value of the first heat-sensitive resistance element 42) taken account of the difference in ground potential. By making a temperature conversion using the resistance value $R_{T1}$, carried out is a correct temperature measurement eliminated of the problem of potential imbalance between the ground 44 of the power unit 40 and the ground 56 of the control unit 50.

Meanwhile, Vo1 and Vo2 captured in the inactive period (E) has a ratio not matching the predetermined ratio (1:2) because Vo1 is changed toward the increase (see white-blanked arrow G). Consequently, in this case, it is determined that there is an occurrence of failure, such as disconnection or short circuit, in any one or both of the first heat-sensitive resistance element 42 and the second heat-sensitive resistance element 43. Because the Vo1, Vo2 in this case is not reliable, the maximum temperature of service environment for example is "considered as" a heat of the heater 41 and employed. Furthermore, a required fail process is executed, e.g. raising a flag representative of a failure of the thermistor (first heat-sensitive resistance element 42 or second heat-sensitive resistance element 43).

In this manner, the present embodiment can determine an abnormality of the first heat-sensitive resistance element 42 and second heat-sensitive resistance element 43 on a period-unit basis of the control signal C33. Failure detection is possible nearly in real time.

<Modification to Second Embodiment>

The second embodiment was of the pull-up scheme, i.e., two lines 61, 62 are laid between the power unit 40 and the control unit 50, and the first and second heat-sensitive resistance elements 42, 43 are connected in series so that one end of the first heat-sensitive resistance element 42 is drawn to the control unit 50 through the line 61 and connected to the input terminal of the one AD converter 52 and to the power source VCC through the pull-up resistance 51, the other end of the first heat-sensitive resistance element 42 being drawn to the control unit 50 through the line 62 and connected to the input terminal of the other AD converter 53 and to the upper terminal 54*a* of the switch element 54. However, it can be considered to make it in a pull-down scheme, similarly to the foregoing modification to the first embodiment.

Figure 12:
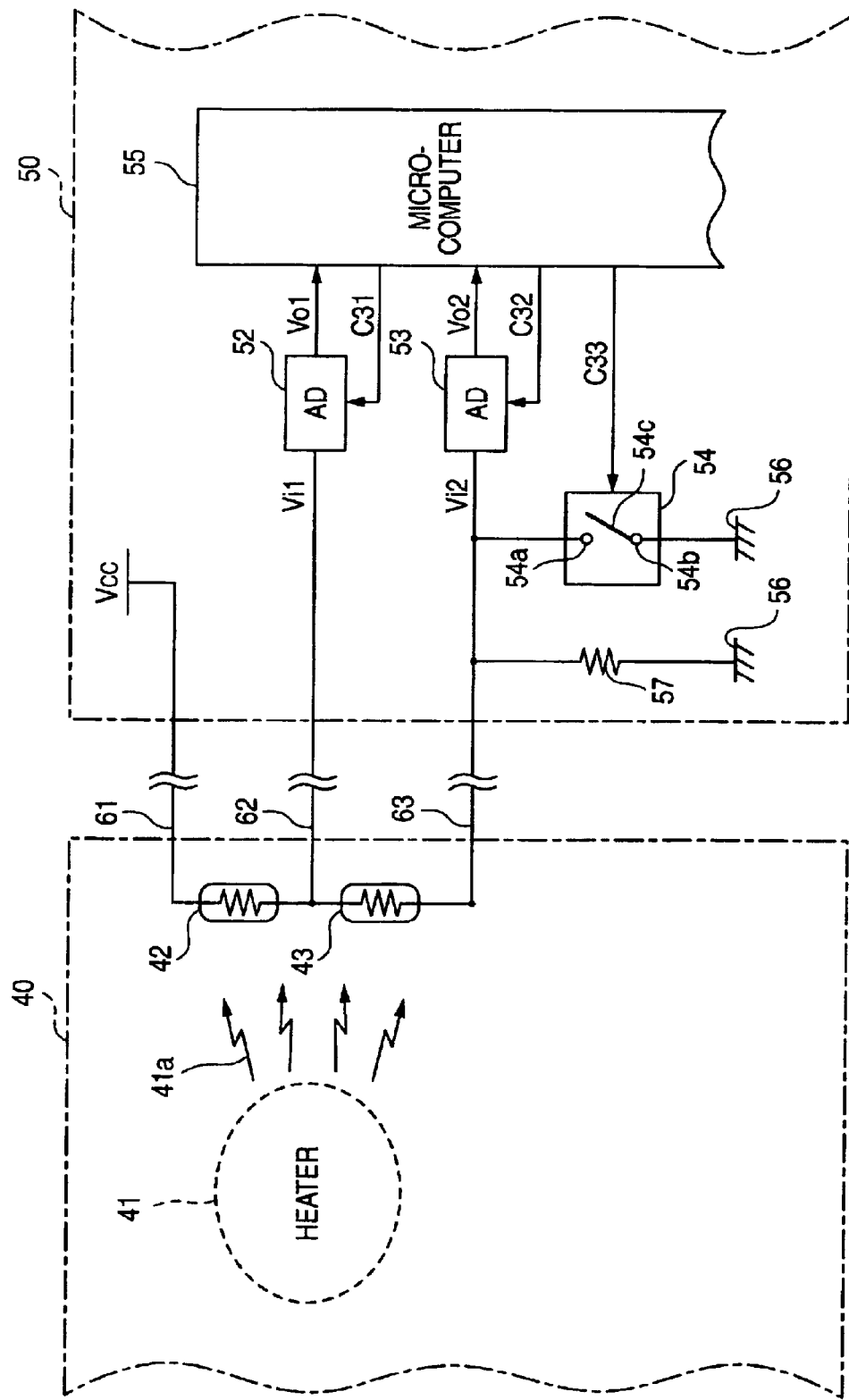
FIG. 12 is a diagram showing a modification of the second embodiment.
Figure 13:
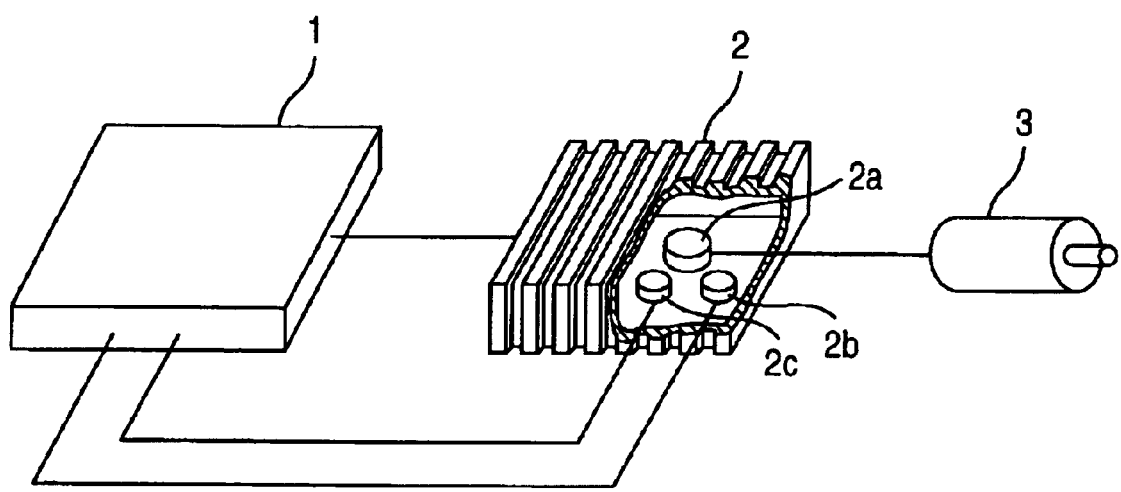
FIG. 13 is a structural view of essential devices of a power-operated auxiliary steering system.

FIG. 12 shows a modification to the second embodiment, which is an example employing the pull-down scheme. In this figure, three lines 61–63 are laid between a power unit 40 and a control unit 50. First and second heat-sensitive resistance elements 42, 43 are connected in series. The first heat-sensitive resistance element 42 has one end connected to a power source VCC of the control unit 50 through the line 61. Meanwhile, the other end of the first heat-sensitive resistance element 42 and one end of the second heat-sensitive resistance element 43 are drawn to the control unit 50 through the line 62 and connected to an input terminal of one AD converter 52. Furthermore, the other end of the second heat-sensitive resistance element 43 is drawn to the control unit 50 through the line 63 and connected to an input terminal of the other AD converter 53 and to a ground 56 through a pull-down resistance 57. The pull-down resistance 57 has respective ends connected to an upper terminal 54*a* and a lower terminal 54*b* of the switch element 54.

The AD converters 52, 53 have output terminals respectively connected to two input ports of the microcomputer 55. One AD converter 52, in a duration the control signal C31 outputted from the microcomputer 55 is active, converts an input voltage Vi1 into a digital signal Vo1 and outputs it. The other AD converter 53, in a duration the control signal C32 outputted from the microcomputer 55 is active, converts an input voltage Vi2 into a digital signal Vo2 and outputs it. The switch element 54, in a duration the control signal C33 outputted from the microcomputer 55 is active, closes its contact 54*c* to connect between the upper terminal 54*a* and the lower terminal 54*b*.

With the configuration like this, by determining whether or not the ratio of Vo1 and Vo2 (correctly the ratio of "VCC–Vo1" and "VCC–Vo2") captured upon making the control signal C33 inactive matches a predetermined ratio (1:2), it is possible to correctly determine a good/poor operation of the first heat-sensitive resistance element 42 and second heat-sensitive resistance element 43. Accordingly, besides a disconnection failure in the first heat-sensitive resistance element 42 and second heat-sensitive resistance element 43 as a matter of course, a short circuit failure whose symptom gradually proceeds can be sensed swiftly, enabling to take a required fail countermeasure. For example, where applied to a vehicular power-operated steering system, it can contribute to the reliability improvement of the system. Moreover, the problem of ground potential imbalance can be eliminated by the Equation (7), allowing reliable temperature measurement.

<Other Modifications>

In the foregoing embodiments and the modifications thereof, the switch element 23, 54 was provided as one of essential constituent elements. However, this is mere one form for understanding the substance of the invention. It is, of course, possible to use a switching element such as a relay or a transistor. In brief, it is satisfactorily if the one is capable of realizing the same function as the switch element 23, 54, e.g. an arbitrary port or input/output terminal (that can selectively assume a high-impedance state or an L-level state) of the microcomputer 24, 55 may be utilized. This is because the port or input/output terminal in a high-impedance state corresponds to the opened switch element 23, 54 at its contact 23c, 54c while the port or input/output terminal in an L-level state corresponds to the closed switch element 23, 54 at its contact 23c, 54c. Which one is adopted is merely a matter of design.

According to this invention, provided that the pull-up resistance or pull-down resistance has a resistance value $R_P$ and the heat-sensitive resistance element has a resistance value $R_T$, the voltage (V1) of the heat-sensitive resistance element in the case of the first voltage extraction mode is given by "VCC×$R_T$/($R_P$+$R_T$)" while the voltage (V2) of the heat-sensitive resistance element in the case of the second voltage extraction mode is given by "VCC×$R_T$/(2$R_P$+$R_T$)".

Accordingly, when the two heat-sensitive resistance elements are normally operating (no occurrence of disconnection or short circuit failure), the voltages respectively extracted in the first and second extraction modes have a ratio matching a ratio of the foregoing two equations (V1:V2), i.e. matches "1/($R_P$+$R_T$):1/(2$R_P$+$R_T$)". Thus, the two heat-sensitive resistance elements can be positively determined for a presence or absence of failure.

Meanwhile, in the case of separately providing a unit accommodating a heater and two heat-sensitive resistance elements and a unit accommodating a pull-up or pull-down resistance, extraction mode executing means and determining means and thereby connecting between these with a wire line, it is satisfactory to provide at least a first line connecting between the pull-up or pull-down resistance and the two heat-sensitive resistance elements, a second line connecting between one heat-sensitive resistance element and extraction mode executing means, and a third line connecting between the other heat-sensitive resistance element and a ground or power source. Thus, the number of lines can be reduced as compared to the prior art (see FIG. 14). Meanwhile, because of selective execution of first and second extraction modes, one AD converter can be shared between the modes, making it possible to reduce the number of AD converters and the number of pull-up or pull-down resistances.

According to this invention, provided that the pull-up resistance or pull-down resistance has a resistance value $R_P$ and the heat-sensitive resistance element has a resistance value $R_T$, the voltage (Vo1) of one heat-sensitive resistance element in the case of the first voltage extraction mode is given by "VCC×2$R_T$/($R_P$+2$R_T$)" while the voltage (Vo2) of the other heat-sensitive resistance element is by "VCC×$R_T$/($R_P$+2$R_T$)".

Accordingly, when the two heat-sensitive resistance elements are normally operating (no occurrence of disconnection or short circuit failure), the voltages extracted in the first and extraction mode have a ratio matching a ratio of the foregoing two equations (Vo1:Vo2), i.e. "1:2". Thus, the two heat-sensitive resistance elements can be positively determined for a presence or absence of failure.

Meanwhile, in the case of separately providing a unit accommodating a heater and two heat-sensitive resistance elements and a unit accommodating a pull-up or pull-down resistance, extraction mode executing means and determining means and thereby connecting between these with a wire line, it is satisfactory to provide at least a first line connecting between the pull-up or pull-down resistance and one of the heat-sensitive resistance elements and a second line connecting between the other end of the one heat-sensitive resistance element and extraction mode executing means. Thus, the number of lines can be reduced as compared to the prior art (see FIG. 14). Meanwhile, because of selective execution of first and second extraction modes, it is also possible to reduce the number of pull-up or pull-down resistances.

Meanwhile, according to this embodiment, by the equation "$R_P$×(Vo1−Vo2)/(VCC−Vo1)", it is possible to determine a correct resistance value of the heat-sensitive resistance element taken account of a ground potential difference. There is no need of providing a ground line between the two units, hence further making possible to reduce the number of lines.

What is claimed is:

1. A temperature detecting device comprising:

two heat-sensitive resistance elements arranged nearby an arbitrary heater and made even in characteristic;

extraction-mode executing means for selectively executing a first voltage extraction mode for connecting the two heat-sensitive resistance elements in parallel between a power source and a ground through one of a pull-up resistance and a pull-down resistance and extracting a voltage of the two heat-sensitive resistance elements by a resistance divisional voltage, and a second voltage extraction mode for connecting any one of the two heat-sensitive resistance elements between the power source and the ground through one of a pull-up resistance and a pull-down resistance and extracting a voltage of the one heat-sensitive resistance element by a resistance divisional voltage; and determining means for determining whether or not the voltage extracted in the first extraction mode and the voltage extracted in the second extraction mode have a ratio matching a predetermined ratio, thereby determining a presence or absence of failure in the two heat-sensitive resistance elements.

2. A temperature detecting device according to claim 1, the determining means makes the predetermined ratio as "1/($R_P$+$R_T$):1/(2$R_P$+$R_T$)" provided that the one of the pull-up resistance and the pull-down resistance has a resistance value $R_P$ and the two heat-sensitive resistance elements have a resistance value $R_T$.

3. A temperature detecting device comprising:

two heat-sensitive resistance elements arranged nearby an arbitrary heater and made even in characteristic;

extraction-mode executing means for selectively executing a first voltage extraction mode for connecting the two heat-sensitive resistance elements in series between a power source and a ground through one of a pull-up resistance and a pull-down resistance and extracting respective voltages of the two heat-sensitive resistance elements by a resistance divisional voltage, and a second voltage extraction mode for connecting any one of the two heat-sensitive resistance elements between the power source and the ground through one of a pull-up resistance and a pull-down resistance and extracting a voltage of the one heat-sensitive resistance element by a resistance divisional voltage; and determining means for determining whether or not the two voltages extracted in the first extraction mode have a ratio matching a predetermined ratio, thereby determining a presence or absence of failure in the two heat-sensitive resistance elements.

4. A temperature detecting device according to claim 3, wherein the determining means makes the predetermined ratio as "1:2".

5. A temperature detecting device according to claim 3, wherein provided that the power source is VCC, one of the pull-up resistance and the pull-down resistance has a resistance value $R_P$, and the two voltages extracted in the first extraction mode are respectively Vo1 and Vo2, a resistance value of the heat-sensitive resistance element of upon executing the second extraction mode by an equation "$R_P \times (Vo1-Vo2)/(VCC-Vo1)$".

* * * * *